United States Patent [19]

Laundre' et al.

[11] Patent Number: 4,943,125
[45] Date of Patent: Jul. 24, 1990

[54] SOLAR COLLECTOR

[76] Inventors: John W. Laundre', 2865 Janet, Pocatello, Id. 83201; Timothy D. Reynolds, 190N 680 W, Blackfoot, Id. 83221; Mary B. Reynolds, 11372 W. Whispering Cliffs Dr., Chubbuck, Id. 83202

[21] Appl. No.: 301,877

[22] Filed: Jan. 26, 1989

[51] Int. Cl.[5] .............................................. G02B 6/00
[52] U.S. Cl. .................... 350/96.1; 350/96.18; 350/96.24
[58] Field of Search ............... 350/96.1, 96.18, 96.23, 350/96.2, 96.24; 126/417, 451; 159/903

[56]  References Cited
U.S. PATENT DOCUMENTS

| | | | |
|---|---|---|---|
| 4,201,197 | 5/1980 | Dismer | 350/96.1 X |
| 4,275,950 | 6/1981 | Meyer | 350/96.1 |
| 4,389,085 | 6/1983 | Mori | 350/96.1 |
| 4,411,490 | 10/1983 | Daniel | 350/96.18 |
| 4,425,905 | 1/1984 | Mori | 350/96.1 X |
| 4,461,278 | 7/1984 | Mori | 350/96.1 X |
| 4,723,826 | 2/1988 | Whitaker | 350/96.1 |
| 4,798,444 | 1/1989 | McLean | 350/96.24 |

Primary Examiner—Frank Gonzalez
Assistant Examiner—John Ngo
Attorney, Agent, or Firm—Richard C. Litman

[57] ABSTRACT

The following invention discloses a solar collector for the collection and distribution of incident electromagnetic radiation. It is a collector which utilizes optic fibers as the direct means for solar energy concentration and collection. The collector is of a hemispherical design, or a variation thereof, allowing for the even collection of sunlight regardless of the sun's position relative to the horizon. Furthermore, the collector is of lightweight design and contains few internal parts. These features provide for a device that requires little maintenance and allows for high functionality.

8 Claims, 2 Drawing Sheets

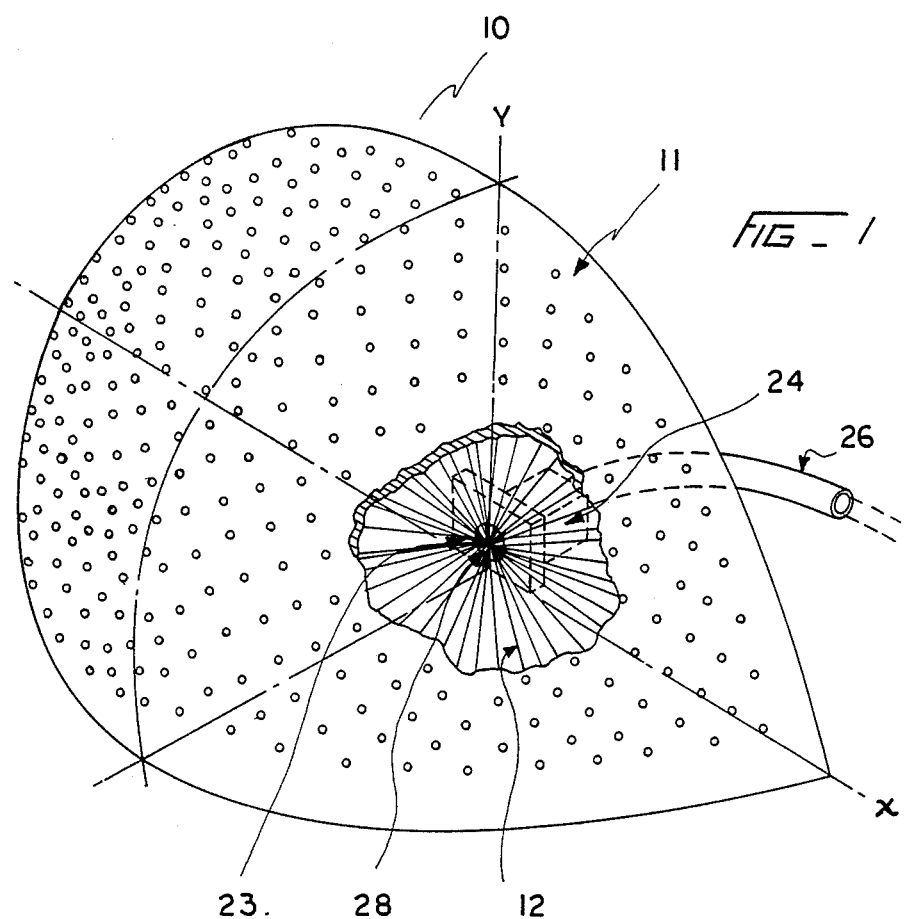
FIG_1
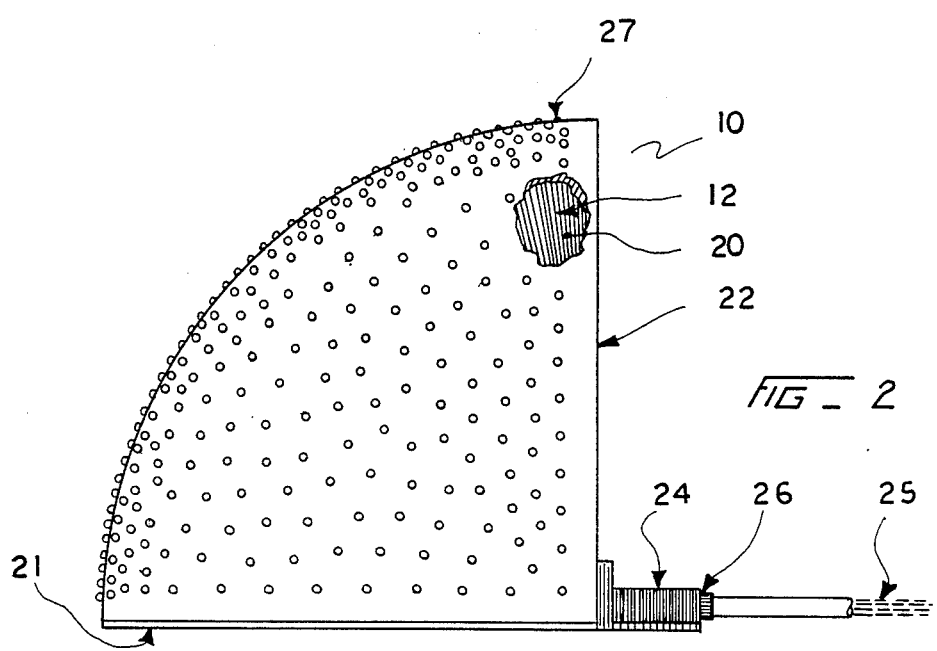
FIG_2

SOLAR COLLECTOR

BACKGROUND OF THE INVENTION

1. FIELD OF THE INVENTION

This invention relates generally to the field of solar collectors, and more particularly to the collection and distribution of incident electromagnetic radiation utilizing optic fibers as the direct means for solar engergy concentration and collection.

The art of collecting solar energy is a rapidly growing field. It began in response to the need for an inexpensive alternative to fossil and nuclear fuels. Moreover, there arises an additional advantage to the use of solar energy. The use of solar technology is considered to be a non-polluting form of energy production as compared to the two fuels mentioned. As a result of these advantages, the development of solar energy production has been ardently pursued.

However, the usefulness of solar energy as an economically feasible alternative has yet to be proven. The current designs for solar collectors involve costly materials, tracking devices, and support equipment. This is true whether the design involves a solar cell arrangement or a water heating design, both of which constitute the majority of current technology. Presently, the large capital investment required for a solar collector design as compared with the eventual returns is prohibitive. The factors that comprise this prohibition involve costly designs, control systems, and tracking systems.

There are two basic avenues the solar development industry has traditionally followed. The first and perhaps most widely known of these avenues is the field of solar cell technology. Solar cells are devices for the collection of incident sunlight wherein this sunlight is converted directly into electricity. The second of these two designs involves the heating of a transport medium or fluid by infrared radiation, a specific segment of the electromagnetic spectrum.

When dealing with the solar cell design, in order to collect the most sunlight possible, these cells are almost always arranged in a panel fashion. A panel consists of an assemblage of parts arranged in such a way as to form a flat, planar structure. Panels of these solar cells are further connected to one another to produce the energy requirements of the application. This arrangement is prohibitive. Individual solar cells are very expensive, and in order to produce a sizable amount of electricity by these cells, literally thousands of them must be connected together. Not only is such an arrangement expensive, but large applications can consume vast quantities of acreage such that one may obtain maximum benefits.

There exists an additional problem when the panels in which these cells are arranged are exposed to environment conditions. Solar cells are particularly susceptible to the effects of varying temperatures and varying humidity. Wear on the cells is accelerated by adverse weather conditions. This wear necessitates the need for continual replacement and maintenance. To achieve the maximum efficiency of the cells requires a strictly controlled environment. It would be of great advantage if the cells could be placed in a remote location where the environment can be closely monitored. Clearly, this is impossible when the cells are located, for example, on the roof of a house or the side of a building.

A further explanation is required to account for the high cost associated with the solar cell panel design. The panels are usually designed as large flat plates to maximize the collection area exposed to solar radiation. Maximum exposure is attained when the panels are perpendicular to the rays of the sun. Moreover, to assure a constant exposure, the normal to these plates or panels must be aligned toward the sun continually.

As is well known, the sun has two primary motions. During the day, the sun moves from east to west. Seasonally, the sun moves from north to south, its degree of variation dependent upon the observer's geographic latitude. To account for this variation, a tracking system must be utilized. This insures that the panel absorbs the maximum solar energy possible. Such a tracking system, because of the fine control needed, can be both complicated and expensive.

The second form of solar collection involves the conversion of direct sunlight into the infrared portion of the electromagnetic spectrum. In this embodiment of the art, heat is used to warm water or some equally useful transport medium. This heated fluid is then piped to the interior of a home or building where the thermal energy is used for heating. However, this type of solar collection is subject to the same problems as the solar cell variety; high costs, tracking systems, and a planar design. These factors limit the economic usefulness of this application as well.

Generally, the piping for such a heating system is arranged in a planar fashion in much the same fashion as the cell variety. Such a design contains the same fallacy as the solar cell design; large amounts of land are needed for a sizable application. Additionally, the initial investment requires the purchase of complicated valving and piping systems. Also, a tracking system of requisite complexity must be used to assure maximum thermal output. The combination of these investments constitutes the large capital expenditure associated with the "hot water" design.

From all aspects of this design, there exist a multitude of problems. The water heating system is subject to weather conditions. The fluid medium is subject to freezing and boiling, both of which may damage the piping. The piping system is further subject to corrosion both from within the pipes and from without. As aforementioned, these problems are further complicated by the need for the same type of tracking system as associated with the solar cell design.

Both of the aforementioned systems for the collection and use of solar energy require still another additional feature which makes their feasibility for many application costly. In both cases, the devices must be used in situ, and this means that the conversion of solar energy to a more useful form must occur at the collection point. In order to achieve this end, the solar devices must be mountd on a roofing structure of a home or building or its equivalent. As a result, the supportig trusses of these roofing structures must be reinforced to accommodate the additional weight. The cost of such reinforcement adds to the overall expenditure of the application. Consequently, the total cost of the project is enourmous.

The present invention solves many of the inherent problems associated with the aforementioned designs. However, it is by no means the solution to all of them. The present invention does not involve the high costs associated with tracking systems, control systems, or complicated design. It utilizes the principle of optic fibers to simplify the collection of solar energy and permit the transmission of this energy to a remote location. Such a design further saves expense when dealing with the use of solar cells.

2. DESCRIPTION OF THE PRIOR ART

The use of fiber optics in solar collection is not a new technology. Many have used such a design in the past to circumvent the same problems heretofore established. However, these inventions also choose to ignore the same problems that the present invention addresses. The present invention addresses two stumbling blocks: (1) the issue of cost through design, and (2) the issue of cost through tracking.

As mentioned, there are several patents which disclose the use of optic fibers for the collection of solar energy. Perhaps the most diverse of the fiber optics patents in U.S. Pat. No. 4,411,490 issued to Maurice Daniel on Oct. 25, 1983. With regard to this patent, the inventor chooses to utilize fiber optic as a transport medium after the sunlight has been concentrated in a peripheral device. However, as with most of the patents in the same realm, the designs continue to focus around the planar design. This indicates that the invention behooves the necessity for a tracking system for maximum benefits.

The current slant for solar collection design generally describes a device with a multitude of parts. This complicates the device making maintenance and replacement costly. The presently invention circumvents this fallacy. It is comprised essentially of three major components: optic fibers, a housing, and focusing lens means.

The design does not involve complicated processes for the collection and concentration of solar energy. A simple lens attached to or formed on the ends of each exposed optic fiber provides the necessary concentration of radiation. In the case of the present invention, the collection device itself is the optic fiber. No additional structures are needed to facilitate collection. This allows for a relatively inexpensive means for solar collection.

Additionally, the unique hemispherical design allows for a constant collection of solar radiation regardless of the position of the sun, whether this position is due to either daily or seasonal changes. The hemispherical design assures that at least half of the collector is always oriented toward the sun. This means that no tracking device is needed to assure that sunlight will be collected. It is an essential feature of immediate benefits that the design of the present invention lends itself to a light weight composition as well. Should the solar collector be mounted on the roof of a home or building, the suppor trusses need not be designed to withstand the compressive and tensile forces associated with a high weight application. Additionally, the light weight feature allows for simple and easy installation as the device itself does not prove cumbersome to the construction worker.

It is for the reasons described above that this invention is clearly superior to the aforementioned devices.

SUMMARY OF THE INVENTION

It is therefore a principal object of the present invention to provide a simple, inexpensive, practical means for the collection of solar radiation and the transmission and distribution of radiation so gathered.

It is still further an object of the invention to concentrate the solar radiation by means of a simple lens system attached to or formed on the optic fiber ends before transmission through a relatively small number of optic fibers, as arranged in an optic fiber cable.

It is yet another object of the invention to provide a constant surface area for the collection of solar radiation regardless of the position of the sun as relative to the horizon either in its daily track from east to west or its seasonal trek from north to south.

It is yet another object of the present invention to provide a simplified solar panel structure to reduce the cost of maintenance and to further reduce the initial cost of manufacture and installation.

It is yet another object of this invention to provide a solar panel whose size can be adjusted through design to accomodate projects of varying demand.

As a result of these features, a simple design and lack of tracking, the invention provides an inexpensive means for the collection of solar radiation. Should the panels need to be repaired, their simple design alludes to ease of maintenance.

With these and other objects in view which will more readily appear as the nature of the invention is better understood, the invention consist in the novel combination and arrangement of parts hereinafter more fully described, illustrated, and claimed with reference being made to the attached drawings.

BRIEF DESCRIPTION OF THE DRAWINGS

FIG. 1 is a perspective drawing of one variant of the solar collection panel shown as a quartersphere constructed in accordance with the present invention;

FIG. 2 is a cross-sectional view of the embodiment presented in FIG. 1, displaying optic fibers, optic lens, and interior cavity location;

DESCRIPTION OF THE PREFERRED EMBODIMENT

Figure 3:
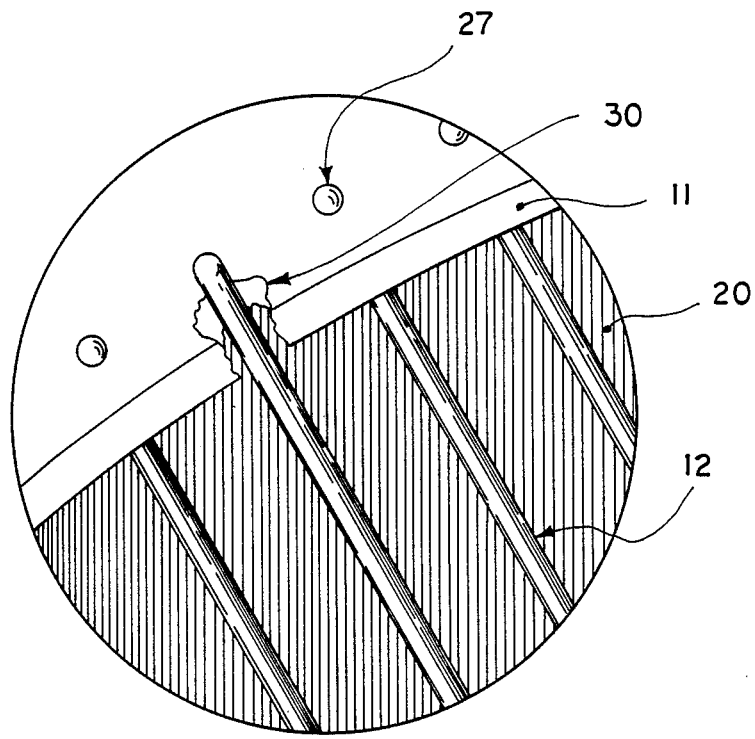
FIG. 3 is an expanded view of the surface of the collector as indicated by FIG. 2, further explaining the fiber lens and fiber pore correlation. Similar reference characters designate corresponding parts throughout the several figures of the drawings.

The description of the preferred embodiment of the invention will now be provided with reference to the aforementioned drawings, FIG. 1, FIG. 2, and FIG. 3.

The solar collection panel is indicated generally in FIG. 1 by 10. Solar collection panel 10 includes a plurality of optic fibers 12 for the collection of solar energy. A plurality of the optic fibers 12 end in a convex shape forming an optic lens means 27 as indicated by FIG 2. The optic lens means 27 increases the collection area of each individual optic fiber 12 to allow for the concentration of the collected solar engergy.

The optic fibers 12 and the optic lens means 27 are to be comprised of such a material as to provide an efficient conduit for the collection and transmission of solar radiation. This material may be opticl glass, but it should be noted that the present invention is not limited solely to such a material. The optic material should be of an appropriate quality as to prevent light dispersal during transmission.

Each optic fiber 12 is disposed through the curved surface 11 of the solar collection panel housing assembly 10 by an optic fiber pore 30. The optic fiber pore 30 is simply a bore through the curved surface 11. The curved surface 11 is of such a design that it is hemispherical or any variation thereof from a small sliver to a full sphere. This design provides for the even collection of solar radiation regardless of the position of the sun to the horizon. The curved surface 11 is the main feature of the housing assembly 10. In addition to the curved surface 11, the housing assembly 10 is further defined by two additional structures as shown in FIG. 2: the base structure 21 and, for less than a hemisphere design, the side structure 22. The housing assembly 10 as assembly encloses the interior cavity 20 as shown in FIG. 2.

The side structure 22 and the base structure 21 are simply flat pieces of material. They are used to enclose the interior cavity 20 and to protect the collector parts located therein from the effect of weather. These structures also prevent the buildup of dirt and other materials within the interior cavity 20 such that the effectiveness of the optic fibers 12 located therein is not affected.

The optic fibers 12 extend from the housng assembly 10 curved structure 11 to an optic fiber assemblage 23 where they are gathered. From this point, the optic fibers 12 proceed through the exist aperture 28 to the optic fiber clamping means 24 where the optic fibers 12 are held fixed. The optic fiber clamping means 24 includes a coupling means 26 for the connection of an energy transmission means 25. The energy transmission means 25 is the equivalent of an optic fiber cable. It allows for the transmission and distribution of the collected solar energy.

The inclusion of an optic fiber clamping means 24 is included to hold fixed the optic fibers 12 within the housing assembly 10. This allows the internal members, especially the optic fibers 12, to be held rigidly. Such a feature assures that the collector will perform to expectations when installed. The optic fiber clamping means 24 prevents the displacement of th optic fibers 12 during transportation and in the event of severe weather conditions.

The embodiments of the present invention have been shown and described herein. It is understood well that any variations of the invention as described may be made by those skilled in the art without departing fromm the scope and spirit of the present invention as disclosed.

We claim:

1. An apparatus for the collection and transmission of incident electromagnetic energy, comprising:
   a housing assembly;
   said housing assembly including a curved structured with opposed interior and exterior surfaces;
   said housing assembly defining an interior cavity;
   a plurality of optic fiber pores included in said exterior surface of said curved structure and disposed therethrough;
   a plurality of optic fibers which extend from said exterior surface of said optic fiber pores to a central location within said interior cavity;
   an assemblage of optic fiber segments within said interior cavity at said central location;
   a means for providing an exit aperture at said assemblage of said optic fiber segments for the collection and concentration of said optic fibers;
   an optic fiber clamping means for the collection, gathering, and holding fixed said optic fibers;
   an energy transmission means attached to said housing assembly;
   a coupling means for the connection to said energy transmission means providing for the distribution of said incident electromagnetic radiation to predetermined application.

2. An apparatus according to claim 1 wherein, said housing is comprised of a light weight material.

3. An apparatus according to claim 1 wherein, said plurality of optic fibers is positioned within each of said optic fiber pores such that the exposed ends of said optic fibers protrude or are at least flush with said exterior surface and may protrude a predetermined distance therebeyond.

4. An apparatus according to claim 1 wherein, said plurality of optic fiber pores are disposed in a pattern whereby the infrared band of electromagnetic radiation is evenly collected.

5. An apparatus according to claim 1 wherein, said plurality of optic fibers includes a hemispherical terminal end which functions as an optic condensing lens.

6. An apparatus accoriding to claim 1 wherein, said curved body surface is of a configuration defined between the limits of a fraction of a sphere to a complete sphere.

7. An apparatus according to claim 6 wherein,
   said housing assembly defines the space of a quartersphere,
   said exist aperture lies at the base of said side structure or said base structure perpendicular to a reference plane defined by said base structure, and
   said exit aperture lies at the midpoint between the radial ends of said side structure as defined by the intersection of said side structure with said base structure.

8. An apparatus according to claim 6, wherein,
   said housing assembly defines the space of a hemisphere, and
   said exit aperture lies such that its center point is at the radial center of said base structure or said side structure.

* * * * *